June 14, 1932.  F. E. ADAMS  1,862,561
GAME TRAP
Filed Sept. 21, 1928  2 Sheets-Sheet 1

INVENTOR
Francis E. Adams
BY
ATTORNEY

June 14, 1932.  F. E. ADAMS  1,862,561
GAME TRAP
Filed Sept. 21, 1928  2 Sheets-Sheet 2

INVENTOR
Francis E. Adams
BY
ATTORNEY

Patented June 14, 1932

1,862,561

UNITED STATES PATENT OFFICE

FRANCIS E. ADAMS, OF ONEIDA, NEW YORK, ASSIGNOR TO TRIUMPH TRAP COMPANY, INC., OF NEW YORK, N. Y., A CORPORATION OF NEW YORK

GAME TRAP

Application filed September 21, 1928. Serial No. 307,443.

This invention relates to traps, more particularly to traps adapted for use in the catching of fur-bearing animals.

One of the objects of the invention is to provide a trap which may be set with greater facility than has obtained in traps of this character as hitherto constructed.

Another object of the invention is to provide a construction such that heavier and more powerfully springed traps can be set by a trapper without the necessity of having to resort to the use of his feet or specially constructed setting devices.

A further object of the invention is to provide a trap having a plurality of actuating springs or levers of such construction that one or more of said actuating springs or levers may be held temporarily in set position, or a position approximating the set position, while the other lever is being moved to set position.

A further object of the invention is to provide in a device of this character, one or more pivotally mounted catches or hook members, adapted to engage and hold actuating levers or actuating springs of traps in fixed positions against the tension of their springs, while the jaws of the trap are being moved and locked in set positions.

Other objects and aims of the invention, more or less specific than those referred to above, will be in part obvious and in part pointed out in the course of the following description of the elements, combinations, arrangements of parts and application of principles, constituting the invention; and the scope of protection contemplated will be indicated in the appended claims.

In the accompanying drawings, wherein I have illustrated preferred forms of embodiments of my invention:

Similar reference characters refer to similar parts throughout the several views of the drawings.

Figure 1:
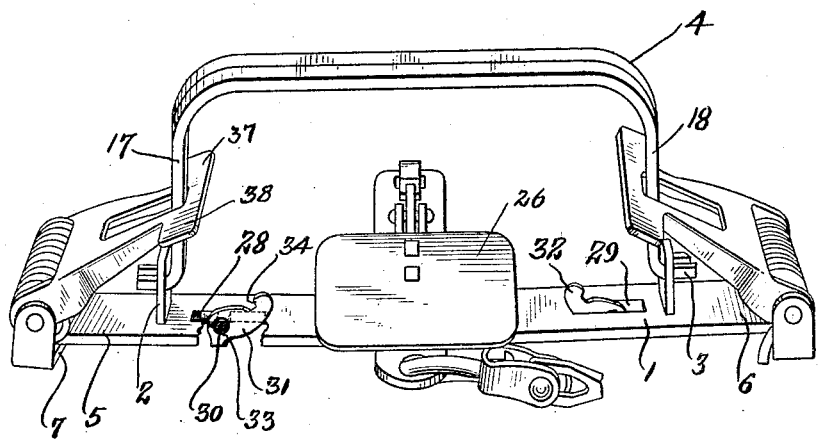
Figure 1 is a perspective view of one embodiment of my invention.

Before proceeding to a description of the structural parts of the trap, embodied in the preferred forms of invention shown in the drawings, it may here be noted that those who pursue trapping as a trade and others who use game traps, find it difficult to set traps as hitherto constructed, especially large and powerful traps, due to several reasons. In setting a large trap while on snow-shoes or in marshy ground, where there is no opportunity to step on the springs or actuating levers with the feet, whereby to depress them, the users of the traps often encounter considerable difficulty in setting the traps. Moreover, where traps such as illustrated in the drawings, wherein double spring actuating devices are employed, the strength of the springs is often too great for both actuating levers to be moved simultaneously into setting position, which it is necessary to do because both of the actuating members must be depressed before the jaws can be moved to set positions.

As will be seen from the following description, in my improved trap, these difficulties are greatly minimized, if not altogether eliminated.

Figure 4:
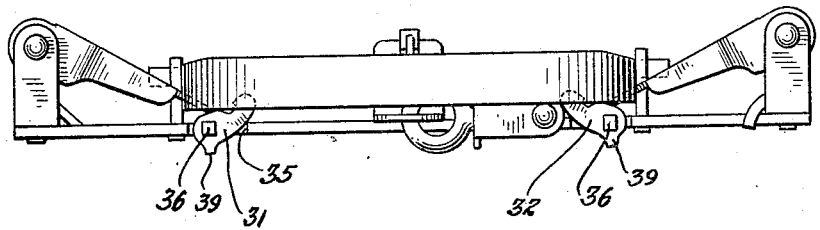
Figure 4 is a view similar to Figure 3, but showing the trap in set position.

Referring now to the drawings, the reference numeral 1 indicates the usual base plate or foundation of the trap, provided with the upstanding apertured lugs or flanges 2, through which the pintles 3 of the jaws 4 of the trap extend, the construction being such that the jaws may be swung from the closed position shown in Figure 1 to the open position shown in Figure 4, as is usual in trap construction.

Figure 3:
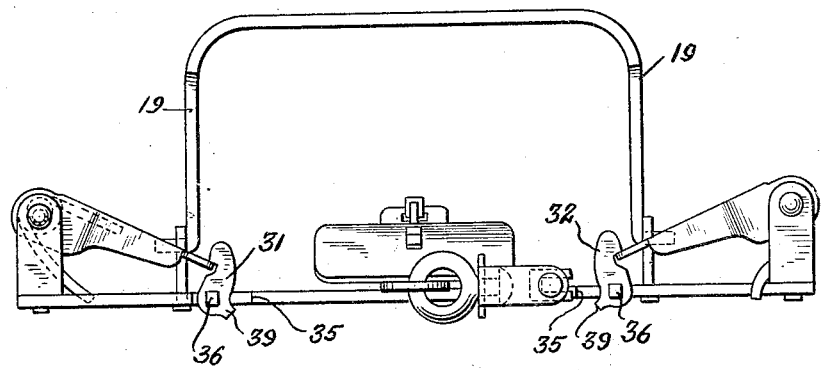
Figure 3 is a side elevational view, showing a slightly different embodiment of my invention from that illustrated in Figures 1 and 2, and showing the actuating levers held with their springs in stressed condition.

In the present instance, the base plate or foundation 1 is provided with the end extensions 5 and 6, to which are attached plates 7, each of which is provided with a pair of upstanding ears or flanges 8 and 9, said ears being apertured so as to receive the pivot pins 10 or 11, which form a pivotal support for the jaw actuating levers 12 and 13. The levers 12 and 13 are each apertured as at 14 and 15 to receive shanks or legs 17 and 18 of the jaws 4. Thus, it will be seen that when the levers 12 and 13 are in their uppermost positions, as shown in Figures 1 and 3, the jaws 4 are in closed positions, the upward movement of the lever being arrested by the shoulders 19, formed on the jaws 4. When the levers are in their depressed positions, as shown in Figures 3 and 4, the jaws 4 will fall by gravity to the position shown in Figure 4. The jaws are held in locked position, or one of them is, by means of a detent or latch 20, which is pivoted upon an upstanding flange 21, formed at the end of a cross piece 22, riveted at 23 to the foundation 1. Latch 20 cooperates with a notch or shoulder 24 formed on the arm 25 of a pan 26, said arm being pivoted on the pin 27, which extends through upstanding flanges formed intermediate the ends of the cross piece 22. It will be seen that when the jaws are in the position shown in Figure 4, the latch 20 passes over one of the jaws and its engagement with the shoulder or notch 24 of the pan arm holds that jaw in depressed position, the other jaw, of course, lying open by gravity. When an animal steps on the pan of the trap, the depression of the latter permits latch 20 to escape, whereby the locked jaw is freed and the actuating members then are permitted to swing upwardly to close the trap.

Figure 2:
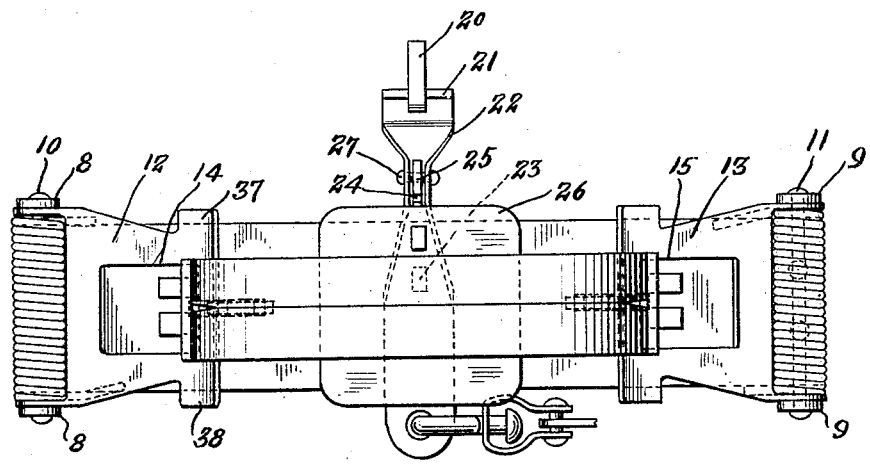
Figure 2 is a top plan view of the construction shown in Figure 1.

Referring now to Figures 1 and 2 of the drawings, the base plate or foundation 1 is apertured at 28 and 29, said apertures being formed by striking out parts of the metal so as to leave an integral part of the base plate extending across the apertures. One of these parts is shown at 30 in Figure 1, where the parts are cut away. These integral parts form pivotal supports for the catches 31 and 32, which are apertured to receive cross pieces or pivotal supports 30. In practice, the metal adjacent the apertures 33 is preferably split to provide a slit, which can be opened up to permit the catches to be positioned on their pivotal supports, whereby the metal of the catches can be pressed together to close the slit, whereby the catches are properly positioned upon their pivotal supports. Each of the catches 31 and 32 is provided with a shoulder 34, the construction being such that when the actuating levers 12 and 13 are pressed downwardly, the trapper can swing catches 31 and 32 rearwardly to engage the shoulders 34 over the ends of the levers, as clearly shown in Figure 3 of the drawings, whereby the jaws 4 will be free to swing by gravity to a position approximating their set positions.

It will be noted that the catches 31 and 32 are pivoted slightly off center, so that they have a natural inclination to swing inwardly to the positions indicated in Figure 4, where they are held in position by their engagement with the end walls 35 of the apertures 28 and 29.

The parts are so positioned that when the jaws 4 swing downwardly into engagement with the ends of the levers 12 and 13, a further slight depression of the jaws by the trapper in setting and locking one of the jaws by the latch 30, will disengage the shoulders 34 of the catches 31 and 32 from the ends of the actuating levers. The engagement of the ends of the levers with the catches will also swing the latter rearwardly so that they will not again be in positions where their shoulders 34 can again engage with the ends of the levers, when the trap is held in a level position, or they may be moved to such positions by the fingers of the trapper, or the catches will automatically swing to their normal positions by gravity.

It will be noted that when the shoulders 34 of the catches are in engagement with the levers, the catches are held in the position shown in Figure 4, by their frictional engagement with the ends of the levers.

Having thus described the construction of this embodiment of my invention, the operation thereof, which should be easily understood, is as follows:

In setting the trap constructed in accordance with the invention, the trapper first depresses one of the actuating levers and locks it by its catch. He then sets the other lever and locks it by its catch. He then permits the jaws 4 to swing downwardly into engagement with the actuating levers, whereby, by slight further forced depression of the jaw to be locked by the latch 20, the catches 31 and 32 are released and they fall by gravity, or they may be moved by the fingers of the trapper to the positions they assume when not in use.

Thus it will be seen that a trapper can use both hands in setting a single actuating lever, whereby a trapper can set a larger and stronger trap with greater facility than he could set traps as hitherto constructed, wherein it is necessary to depress two actuating levers or two actuating springs before the jaws could be swung to their set positions.

Figures 3 and 4 of the drawings provide a slightly modified form of the invention, in that the catches 31 and 32 are pivotally mounted on the pivot pins or lugs 36, which extend laterally from the foundation or base plate 1 of the trap, the edges of said base member or plate 1 being slotted to receive the catches 31 and 32. Otherwise, the construction illustrated in Figures 3 and 4 is the same as that illustrated in Figures 1 and 2.

Another feature of my invention is the provision of the lateral ears or flanges 37 and 38 upon the ends of the actuating levers 12 and 13. These lateral extending flanges or ears form convenient thumb pieces for the trapper, when he is engaged in setting the trap.

It will be noted that in both embodiments of the invention the catches 28 and 29 extend beneath the lower surface of the base plate and are provided with the extensions 39. These extensions are provided so that when the trapper is setting the trap using his thumbs to depress the actuating levers, one of his fingers being then located beneath the trap may be used to swing the catches into their operative positions. These extensions may also be used to swing the catches in the opposite direction, in the event that the trap is not held level, whereby the catches will not swing to their normal inoperative position by gravity.

It will accordingly be seen that I have provided a construction well adapted to attain, among others, all the ends and objects above set forth in a very efficient manner, by means of my improved trap, the difficulties encountered by trappers in setting the old form of trap are eliminated and a trap is produced which the trapper may handle with gloves or mittens, and whereby the use of the feet or trap-setting devices is entirely eliminated.

As many changes could be made in this construction without departing from the scope of the following claims, it is intended that all matters contained in the above description or shown in the accompanying drawings shall be interpreted as illustrated only and not in a limiting sense.

Having thus described my invention, what I claim as new and desire to obtain by Letters Patent, is:

1. In a game trap, in combination, a base plate, a pair of jaws pivotally mounted thereon, a cross-piece passing to the base plate, a pan and jaw-locking latch pivotally mounted upon the base plate, a pair of spring actuated levers pivotally mounted upon the base plate for closing the jaws, and means for independently locking each of said actuating levers against the tension of their springs, when said actuating levers are swung downwardly toward the base plate.

2. In a game trap, in combination, a base plate, a pair of lugs erected upon the base plate, a pair of jaws pivotally mounted in said lugs, means including a pan and a latch for holding one of said jaws in set position, said base plate being provided with an end extension an actuating lever for the jaws pivotally mounted upon said extension, a spring for actuating said lever, a catch pivotally mounted on said base plate within the enclosure formed by the jaws, said catch being to engage the end of said actuating lever and hold it in a depressed position against the tension of its spring.

3. In a game trap, in combination, a base plate, a pair of lugs carried by said base plate intermediate its ends, a pair of jaws pivotally mounted in said lugs, setting devices for the jaws, including a cross-arm, carried by the base plate, a pan and a latch, upstanding lugs mounted upon the end extensions of said base plate, an actuating lever for the jaws pivotally mounted upon each of said last-named lugs, an actuating spring to engage and actuate each of said actuating levers, and a pair of catches pivotally mounted upon said base plate within the enclosure formed by the jaws to engage and hold said actuating levers in their depressed positions against the tension of their springs.

4. In a game trap, in combination, a base plate, a pair of lugs carried by said base plate intermediate its ends, a pair of jaws pivotally mounted in said lugs, setting devices for the jaws, including a cross-arm, carried by the base plate, a pan and a latch, upstanding lugs mounted upon the end extensions of said base plate, an actuating lever for the jaws pivotally mounted upon each of said last-named lugs, an actuating spring to engage and actuate each of said actuating levers, and a pair of catches pivotally mounted upon said base plate within the enclosure formed by the jaws to engage and hold said actuating levers in their depressed positions against the tension of their springs, and said catches being automatically released from their engagement with the actuating levers when the latter are depressed by one of the jaws, in moving the latter to its set position.

5. In a game trap, in combination, a base plate provided with jaw-supporting means, a pair of jaws mounted therein, jaw-setting devices, a pan and a latch, a spring-operated actuating lever pivotally mounted upon the base plate and engaging said jaws, and a catch mounted upon the base plate having a part to engage with said actuating lever when the latter is depressed to hold it against the tension of its actuating spring, and having another part located beneath the base plate by means of which it may be operated.

6. In a game trap of the class described, having the usual base plate, jaws, jaw-setting devices of a spring-controlled actuating lever for the jaws, and said spring-controlled actuating lever having lateral extending thumb or finger pieces.

7. In a game trap of the class described, having the usual base plate, jaws, jaw-setting devices of an actuating lever pivotally mounted upon the base plate and to engage with the jaws, a spring for operating said actuating lever and means formed upon the actuating lever to be engaged with the fingers or thumb of the trapper, whereby the lever may be conveniently depressed.

In witness whereof I affix hereto my signature.

FRANCIS E. ADAMS.